No. 622,543. Patented Apr. 4, 1899.
H. SCHERFF.
PEDAL.
(Application filed Aug. 10, 1898.)
(No Model.)

Witnesses.
Wm. M. Rheem.
Edward R. Barrett.

Inventor
Hermann Scherff
by Gridley & Hopkins
Att'ys

UNITED STATES PATENT OFFICE.

HERMANN SCHERFF, OF CHICAGO, ILLINOIS.

PEDAL.

SPECIFICATION forming part of Letters Patent No. 622,543, dated April 4, 1899.

Application filed August 10, 1898. Serial No. 688,282. (No model.)

*To all whom it may concern:*

Be it known that I, HERMANN SCHERFF, a citizen of the United States, residing at Chicago, in the county of Cook and State of Illinois, have invented certain new and useful Improvements in Pedals, of which the following is a specification.

The present invention relates more particularly to the means for holding the foot in place on the pedal, but incidentally it relates also to the "tread" or bearing for the foot.

Ordinarily the tread is formed upon or is supported by the front and rear plates of the pedal, the parts that are disposed parallel with the pedal-pin; but according to the present invention the tread is upon two plates supported by pivots that are parallel with the pedal-pin, one of said pivots being in front of and the other behind the pedal-pin, and each of these plates extends in both directions from its pivot. One of them is continued to form a toe-clip, and the other has projections presented upward to engage the sides of the shoe or the sole thereof to prevent its sidewise displacement. The outer ends of the plates preponderate, so that when left free they will fall, moving about their respective pivots until arrested by suitable stops, and their inner ends overlap and are curved, so as to present a proper surface for the foot to bear upon in the act of depressing said overlapping ends and thereby elevating the outer ends. An overbalancing weight is used, if necessary, to hold the pedal with the tread at all times uppermost.

The several features of the invention may be embodied in an attachment adapted to be applied to a pedal after both the attachment and the pedal are completed, or they may be incorporated in the pedal structure at the time the latter is made, in which case the features of the invention will be inseparable from the balance of the pedal structure.

The invention consists in the features of novelty that are herein fully described.

Figure 1:
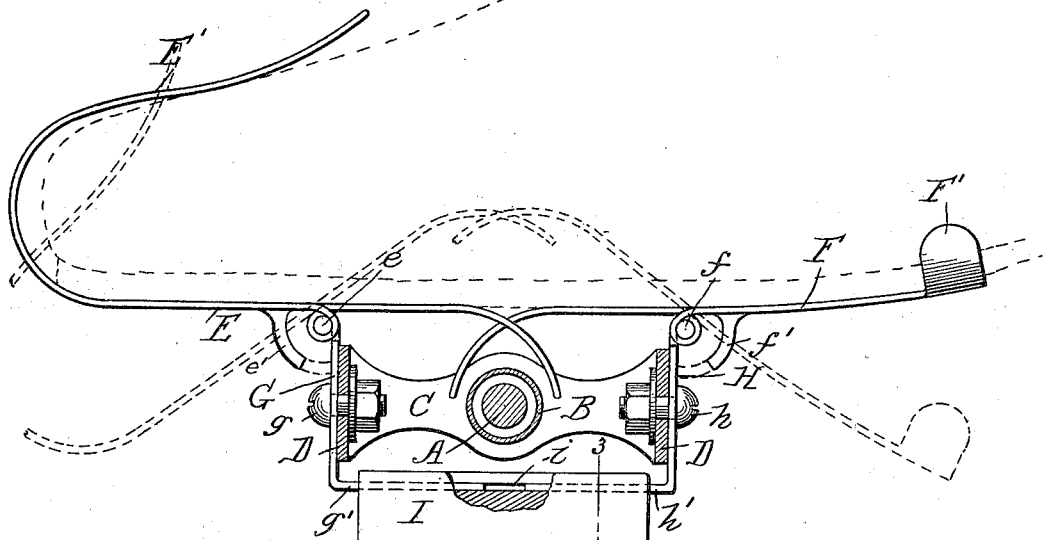
Figure 2:
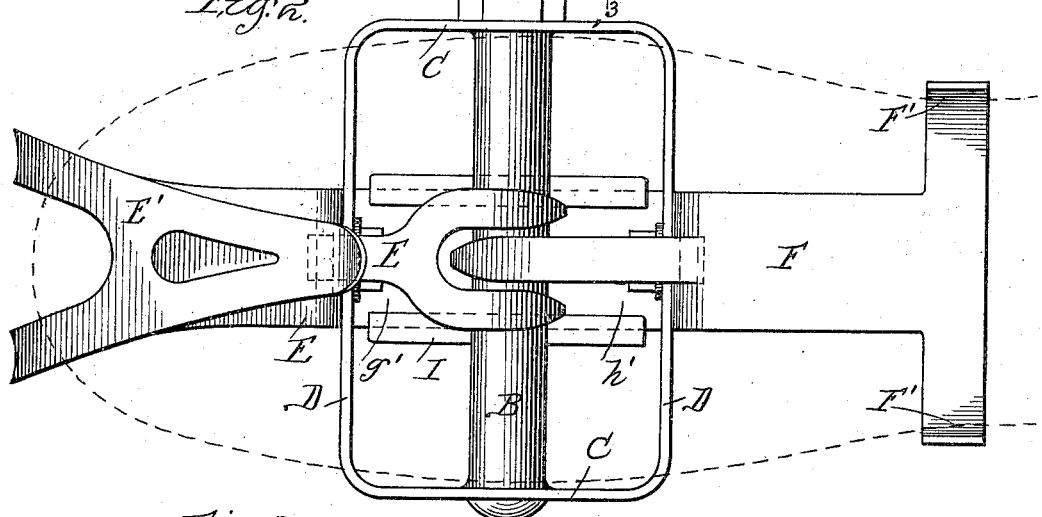
Figure 3:
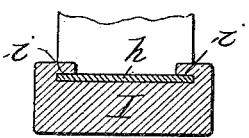
Figure 4:
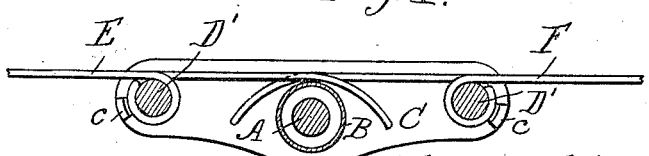

In the accompanying drawings, which are made a part of this specification, Figure 1 is a sectional elevation of a pedal embodying the invention in its preferred form. Fig. 2 is a plan view thereof. Fig. 3 is a section of a portion thereof on the line 3 3, Fig. 1. Fig. 4 is a sectional elevation of a portion of a pedal embodying some features of the invention.

In Figs. 1 and 2 I have shown my invention as being embodied in an attachment for pedals and a pedal of customary construction to which it is attached. This pedal consists of the pin A, the barrel B, the cross-bars C, and the plates D, disposed parallel with the pin, on which the treads are formed or by which they are supported. The attachment consists, essentially, of two pivoted plates E and F, with means for attaching them to the pedal. The pivots $e$ and $f$, respectively, of these plates are shown as being supported by the angle-plates G and H, respectively, and these latter are in turn secured to the pedal proper by screws or bolts $g$ and $h$, respectively. The branches $g'$ and $h'$ of the angle-plates extend beneath the pedal proper and enter undercut grooves $i$ in the weight I, which is sufficiently heavy to hold the pedal with the tread always uppermost. Of the plate E the portion forward of its pivot preponderates, and of the plate F the portion in rear of its pivot preponderates, so that when said plates are free they will assume the positions indicated by dotted lines, their further downward movement being prevented by stops $e'$ and $f'$, respectively. The forward end of the plate E is continued upward and rearward to form a toe-clip E', and the rear end of the plate F is provided with lateral extensions F', the outer ends of which are bent upward for the purpose of engaging the sides of the shoe or the sole thereof. The two plates constitute the tread of the pedal, and preferably they are sufficiently long to extend from the toe to the hollow of the foot. Their inner ends overlap and are curved downward, as shown, so that when in the positions indicated by dotted lines they will present a proper surface for the sole of the shoe to bear upon in the act of moving them from the positions indicated by dotted lines to the positions shown by full lines. The simple act of pressing downward on the curved inner ends of the plates while in the positions indicated by dotted lines will depress them and bring the plates to the positions shown by full lines. This is an important feature, since it greatly facilitates properly placing the foot in the pedal and insures the instant releasing of the foot when pressure is removed from the plates.

Preferably, as before stated, the invention is embodied in an attachment for pedals; but it may be incorporated in and form a part of the pedal structure. In this case the plates D may be modified by omitting the treads which they usually carry and the plates E and F pivoted directly to them or to the parts substituted for them, as shown, for example, in Fig. 4, where they take the form of rods D'. This will bring the pivotal axis of the plates E and F so low that the overbalancing weight may be omitted. Modified stops for limiting the downward movement of the plates E and F are shown at $c$.

What I claim as new is—

1. A pedal having, in combination, two tread-plates, pivots disposed upon opposite sides of the pedal-pin and supporting the plates, respectively, means for limiting the movement of the plates about their pivots, and means adapted to be engaged and operated by the foot for moving the plates to operative positions, one of said plates being continued forward from its pivot and provided with a toe-clip and the other being continued rearward from its pivot to provide a bearing for the foot, substantially as set forth.

2. A pedal having, in combination, two tread-plates, pivots disposed upon opposite sides of the pedal-pin and supporting the plates, respectively, and means for limiting the movement of the plates about their pivots, one of said plates being continued forward from its pivot and provided with a toe-clip, the other of said plates being continued rearward from its pivot to provide a bearing for the foot, and the inner ends of said plates being continued past each other and curved substantially as shown to provide means adapted to be engaged and operated by the foot for moving the plates to operative positions.

3. A pedal having, in combination, two tread-plates, pivots by which they are supported, each of the plates extending both forward and rearward from its pivot, a toe-clip carried by one of the plates, and means carried by the other plate for engaging the shoe, substantially as set forth.

HERMANN SCHERFF.

Witnesses:
L. M. HOPKINS,
N. C. GRIDLEY.